No. 636,902. Patented Nov. 14. 1899.
O. JOHNSON.
APPARATUS FOR ELEVATING, TRANSPORTING, AND DISCHARGING MATERIAL.
(Application filed Dec. 27, 1898.)
(No Model.) 6 Sheets—Sheet 1.

No. 636,902. Patented Nov. 14, 1899.
O. JOHNSON.
APPARATUS FOR ELEVATING, TRANSPORTING, AND DISCHARGING MATERIAL.
(Application filed Dec. 27, 1898.)
(No Model.) 6 Sheets—Sheet 2.

Witnesses.
Inventor.
Ole Johnson.
By Benedict & Morsell.
Attorneys.

No. 636,902. Patented Nov. 14, 1899.
O. JOHNSON.
APPARATUS FOR ELEVATING, TRANSPORTING, AND DISCHARGING MATERIAL.
(Application filed Dec. 27, 1898.)
(No Model.) 6 Sheets—Sheet 3.

Witnesses
Inventor.
Ole Johnson.
By Benedict & Morsell.
Attorneys.

No. 636,902. Patented Nov. 14, 1899.
O. JOHNSON.
APPARATUS FOR ELEVATING, TRANSPORTING, AND DISCHARGING MATERIAL.
(Application filed Dec. 27, 1898.)
(No Model.) 6 Sheets—Sheet 4.

Witnesses
Inventor
Ole Johnson
By Benedict and Morsell
Attorneys

THE NORRIS PETERS CO., PHOTO-LITHO., WASHINGTON, D. C.

No. 636,902. Patented Nov. 14, 1899.
O. JOHNSON.
APPARATUS FOR ELEVATING, TRANSPORTING, AND DISCHARGING MATERIAL.
(Application filed Dec. 27, 1898.)
(No Model.) 6 Sheets—Sheet 5.

Witnesses.

Inventor.
Ole Johnson
By Benedict & Morsell
Attorneys.

No. 636,902. Patented Nov. 14, 1899.
O. JOHNSON.
APPARATUS FOR ELEVATING, TRANSPORTING, AND DISCHARGING MATERIAL.
(Application filed Dec. 27, 1898.)
(No Model.) 6 Sheets—Sheet 6.

Fig. 14.

UNITED STATES PATENT OFFICE.

OLE JOHNSON, OF MILWAUKEE, WISCONSIN.

APPARATUS FOR ELEVATING, TRANSPORTING, AND DISCHARGING MATERIAL.

SPECIFICATION forming part of Letters Patent No. 636,902, dated November 14, 1899.

Application filed December 27, 1898. Serial No. 700,333. (No model.)

*To all whom it may concern:*

Be it known that I, OLE JOHNSON, of Milwaukee, in the county of Milwaukee and State of Wisconsin, have invented a new and useful Improvement in Apparatus for Elevating, Transporting, and Discharging Material, of which the following is a description, reference being had to the accompanying drawings, which are a part of this specification.

My invention has relation to improvements in apparatuses for elevating, transporting, and discharging material.

The primary object of my invention is to provide a construction wherein a counterweight is used in connection with a system of cables for the purpose hereinafter pointed out.

A further object is to provide, in combination with a simple form of gearing for automatically operating the buckets used in this class of devices, the improved arrangement of counterweight and cables hereinafter set forth.

A further object is to provide, in connection with the counterweight and cables above referred to, for automatically operating the buckets used in this class of apparatus by friction-gearing instead of by toothed gearing, thereby making it possible to provide a much more simple arrangement and combination of parts.

A further object is to provide, in combination with the counterweight and cables referred to, a simple form of gearing for automatically operating the so-called "clam-shell" buckets used in this class of devices.

A further object is to provide for an improved form of carriage, stop mechanism therefor, and an improved means for automatically unlocking the bucket from the carriage, as will be hereinafter more fully pointed out.

With the above principal and other incidental objects in view the invention consists of the devices and parts or their equivalents, as hereinafter more fully set forth.

In the accompanying drawings, Fig. 12$^a$ is a detail view of the clam-shell bucket.

Figure 1:
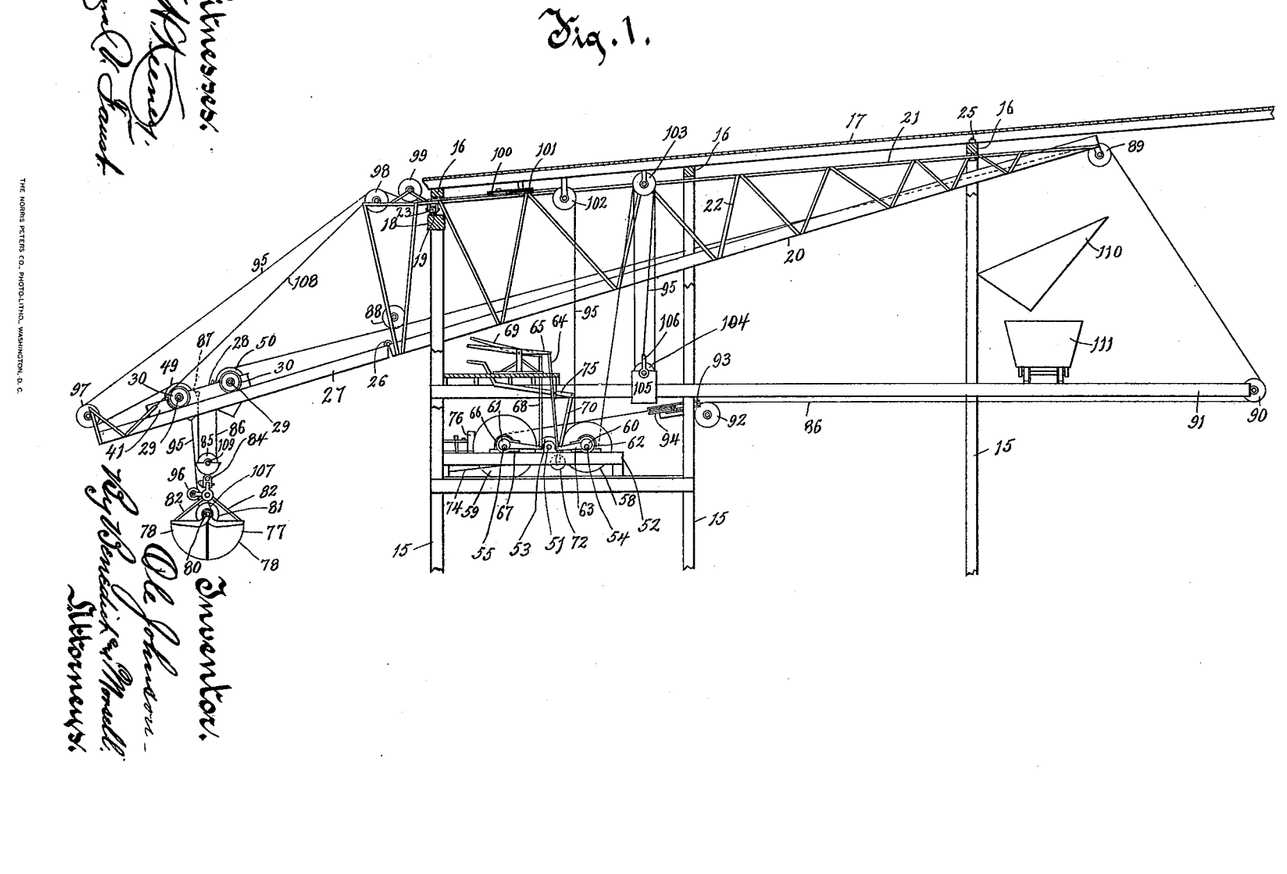
Figure 1 is a side elevation of the complete apparatus, parts broken away.

In Fig. 1 of the drawings I show a permanent or fixed main frame or structure consisting of upright posts 15, connecting cross-beams 16 at the upper ends of said posts, and a top or cover 17. The forward upright posts are also connected by means of another cross-beam 18, arranged below the forward cross-beam 16 and formed on its upper side with a rail 19, which rail is curved in the arc of a circle.

Figures 2, 12:
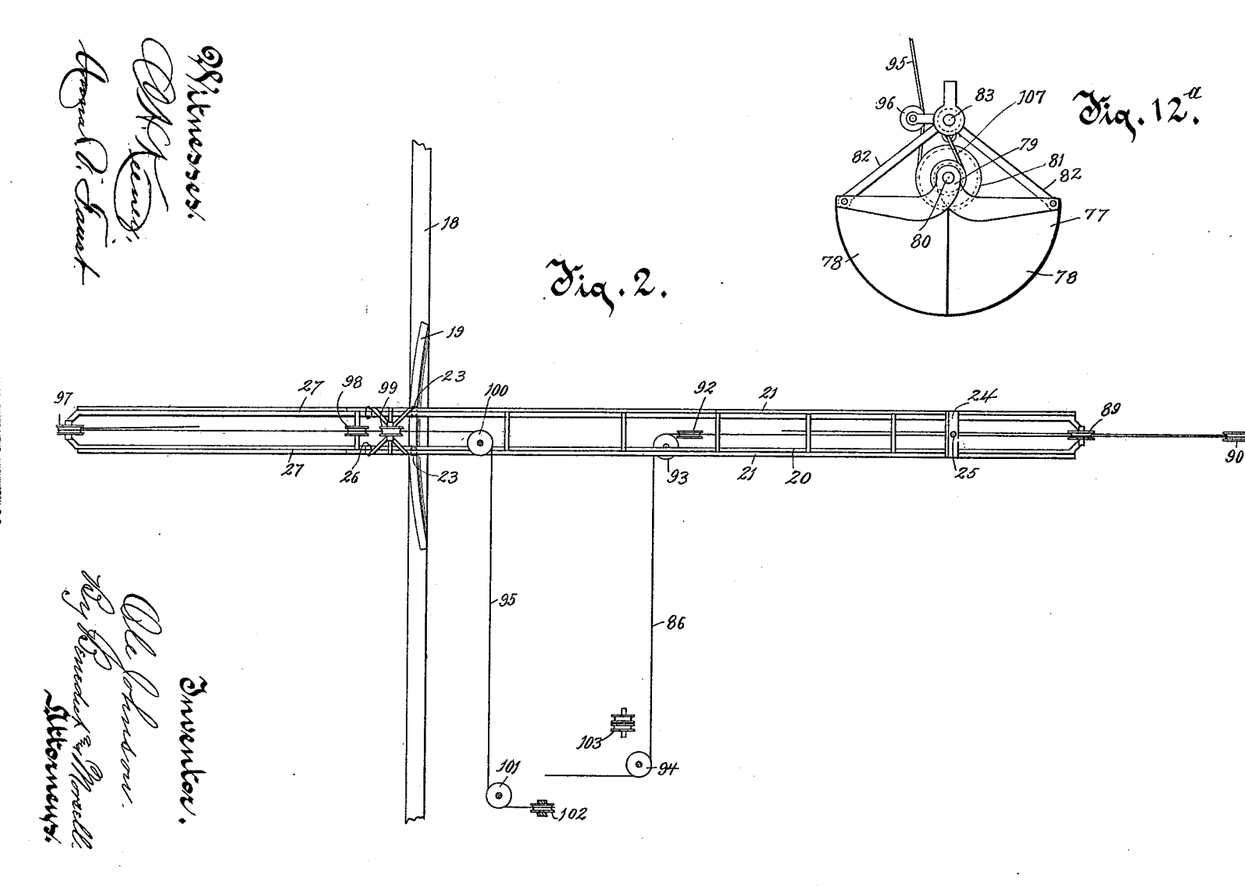
Fig. 2 is a plan view of the upper portion of Fig. 1, with parts removed and showing the location of the pulleys.
Fig. 12 is a side elevation, showing my invention applied to a cantaliver-bridge derrick.

In Figs. 1 and 2 of the drawings I show a boom-frame consisting of parallel side members 20 20, arranged at a gradual declination toward the front of the main frame, and upper bars 21 21. These upper and lower bars are connected by means of diagonal connecting-rods 22. The lower bars are preferably of the form of channel-irons. On the under sides of the bars 21, near the forward ends of said bars, are carried rollers 23 23, which ride on the curved rail 19. These upper bars 21 are connected near their rear ends by means of a cross-piece 24, through which a pivot-pin 25 passes and extends through the rear connecting cross-beam 16. This pivot permits of a swinging of the boom-frame, so that the forward end of said frame is capable of swinging to a limited extent in the arc of a circle, the rollers 23 at the forward end of said boom-frame riding on the curved rail 19.

Pivoted at the forward ends of the lower pieces 20 of the boom-frame is a projecting boom, the pivot 26 thereof being such that the boom is capable of an up-and-down swinging movement. This boom is composed of two side pieces 27 27, preferably in the form of channel-irons and forming continuations of the side pieces 20 and together therewith forming a track for the travel of the carriage thereon. This carriage consists of two side pieces, (indicated by the numerals 28 28,) and mounted in these side pieces are axles 29 29, on which are mounted wheels 30 30, said wheels adapted to run on the rails of the boom-frame and boom. The lower edge of each of these side pieces of the carriage is preferably cut away in the form of an inverted V, as clearly shown in Fig. 6, and from the apices of these V-shaped edges slots 31 extend upwardly. Pivoted to the side pieces of the carriage are levers 32 32. The lower ends of the long arms of these levers are formed with hooks, as clearly shown, and the upper short arms of said levers have connected thereto coiled springs 33, the opposite ends of said springs being connected to the side pieces of the carriage.

Figures 6, 7:
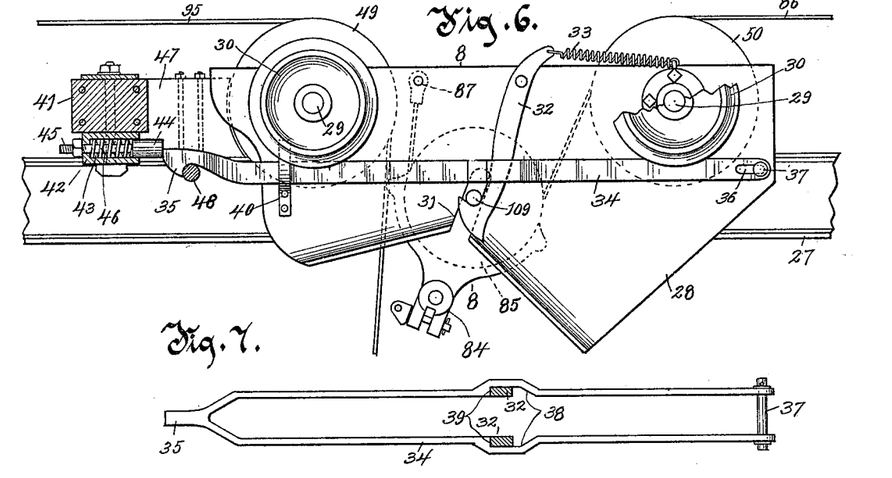
Fig. 6 is a side elevation of the carriage, part of the track, and part of the stop, said stop being in section.
Fig. 7 is a plan view of the holding and releasing arm for the carriage.
Figure 8:
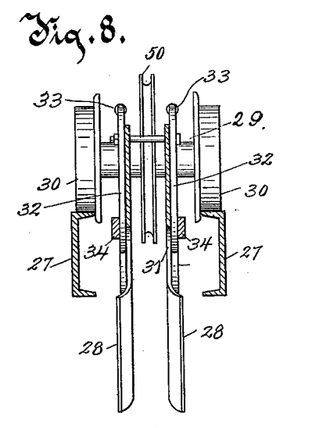
Fig. 8 is a section on the line 8 8 of Fig. 6.
Figure 9:
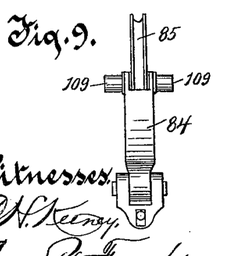
Fig. 9 is a detail of the pulley attached to the clam-shell.
Figure 10:
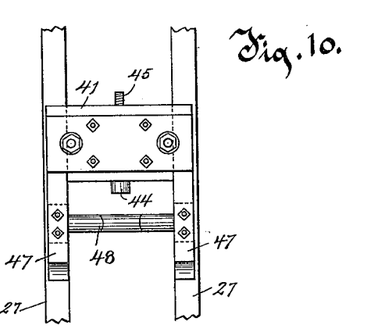
Fig. 10 is a plan view of the stop and part of the holding mechanism for the carriage.

The numeral 34 indicates the locking-arm, which is in the form of a yoke, as most clearly shown in Fig. 7, so as to provide two side members, which are adjacent to the side pieces of the carriage. The forward ends of these side pieces are united to form a hook 35. The rear ends of the side members of this locking-arm are formed with elongated slots 36, through which a transverse pin 37 passes, said pin also, of course, extending through openings therefor in the side pieces of the carriage. At opposite medial points the side members of the locking-arm are formed on their inner sides with recesses 38 38, said recesses terminating at their forward ends in abrupt shoulders 39 39. The forward portions of the side members of the locking-arm are held to the side pieces of the carriage by means of keepers 40.

The numeral 41 indicates a block which is secured near the forward end of the boom. To the under side of this block is secured, by means of bolts or equivalents, a casting or bracket 42, said casting or bracket formed with a chamber 43.

Figure 11:
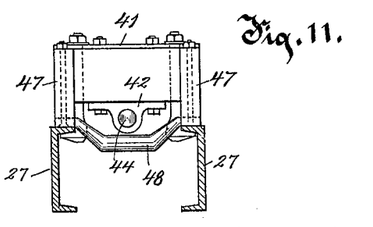
Fig. 11 is an end view of Fig. 10, showing the rails in cross-section.

The numeral 44 indicates a bumper-head which extends into the chamber 43 and is provided with a projecting stem 45, the forward end of said stem extending freely through an opening in the forward end of the casting or bracket 42. Within the chamber 43 is arranged a coiled spring 46, which surrounds the stem 45. Projecting rearwardly from the block 41 are side pieces 47 47, the rear edges of said side pieces being curved in the arc of a circle, as clearly shown. These side pieces are connected at their lower edges by means of a transverse rod 48, which rod at its center is bent downwardly, as most clearly shown in Fig. 11, so as to be readily engaged by the hook 35 at the forward end of the locking-arm.

Between the side pieces of the carriage and mounted on the same axes as the wheels 30 are pulleys 49 and 50, respectively.

Figure 3:
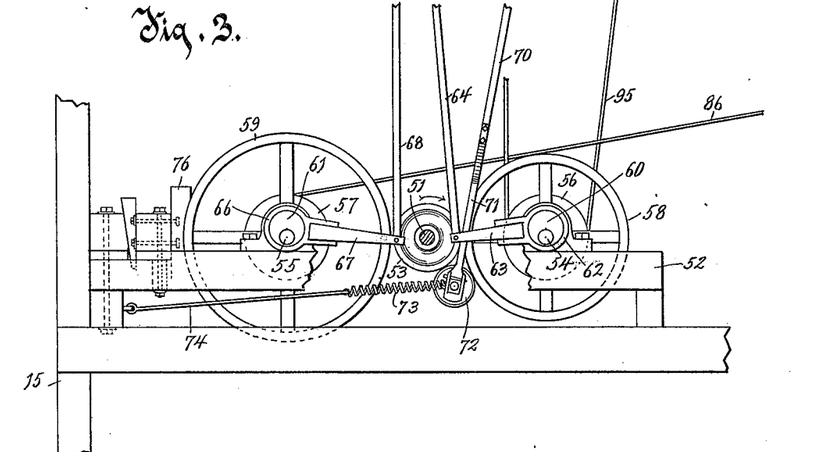
Fig. 3 is a side elevation of the driving mechanism.
Figure 4:
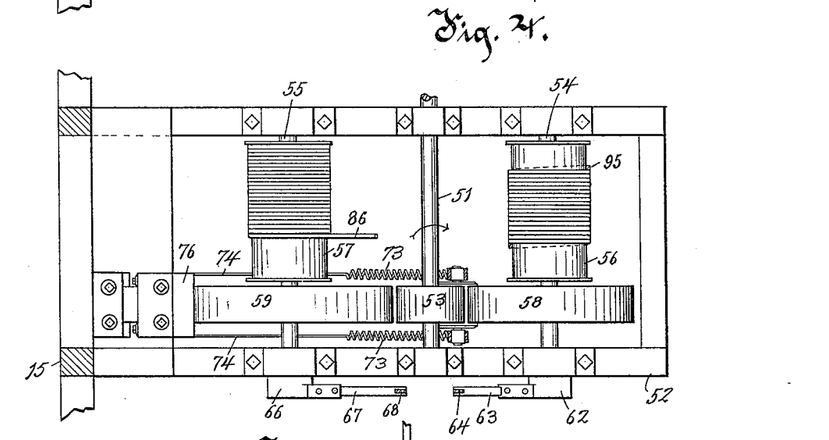
Fig. 4 is a plan view of Fig. 3.
Figure 5:
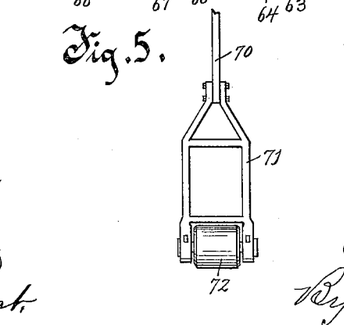
Fig. 5 is a detail view of the reversing-wheel and the arm carrying the same.

The driving mechanism is shown in detail in Figs. 3 and 4 of the drawings. Referring to this mechanism, the numeral 51 indicates a shaft which is mounted in the side pieces of a rectangular frame 52. One end of this shaft projects beyond one of the side pieces of said frame 52 and carries thereon a belt pulley or gearing, (not shown,) whereby said shaft may receive rotation from any source of power. This shaft has mounted thereon a friction-pulley 53. The shaft 51 occupies an intermediate position between two other shafts 54 and 55, respectively, which are also mounted in the rectangular frame. These shafts have drums 56 and 57 mounted, respectively, thereon, and also friction-pulleys 58 and 59 mounted, respectively, thereon, said pulleys being larger than and in line with the friction-pulley 53. One end of each of the shafts 54 and 55 have mounted thereon eccentrics. The eccentric for shaft 54 is indicated by the numeral 60 and the eccentric for the shaft 55 by the numeral 61. Eccentric 60 is surrounded by an eccentric-ring 62, and to this ring is connected an arm 63, said arm in turn having secured to its outer end a link 64. To the upper end of this link is joined a medially-pivoted lever 65. The eccentric 61 is also surrounded by an eccentric-ring 66, and this ring has projecting therefrom an arm 67, said arm having pivotally connected thereto a link 68, the upper end of said link being jointed to a medially-pivoted lever 69.

The numeral 70 indicates an arm which is formed or provided at its lower end with a yoke portion 71. Journaled in the ends of this yoke is a shaft or axis for a small friction-wheel 72, preferably a paper friction. This small friction-wheel 72 is located beneath friction-pulley 53 and adjacent to large friction-pulley 58. The lower end of the yoke is engaged by the ends of coiled springs 73, the opposite ends of said coiled springs being secured to links 74, the other ends of said links being secured to the framework. To the upper end of the arm 70 is joined a medially-pivoted lever 75.

The numeral 76 indicates a brake which has its face curved, as clearly shown in Fig 3, so as to receive contact of the friction-pulley 59.

The numeral 77 indicates the so-called "clam-shell" bucket. Its bottom consists of two pivoted sections 78 78, said bottom-sections having extending upwardly from the upper edges thereof ears or lugs 79. In these ears or lugs are mounted the ends of a shaft 80, said shaft having fast thereon a grooved roller 81. Links 82 are connected to the outer ends of the upper edges of the pivoted bottom-pieces of the bucket and extend upwardly and inwardly to a common connecting-point 83, which point is provided with an upwardly-extending portion 84, said portion carrying a roller 85. The hoisting-rope is indicated by the numeral 86. This rope is secured to the carriage at the point 87, is then extended downwardly and around roller 85, thence upwardly and around pulley 50 of the carriage, and is thence extended rearwardly beneath a pulley 88 and over a pulley 89 at the rear end of the boom-frame, thence downwardly and around a pulley 90 at the rear end of a longitudinal beam 91, thence extended forwardly over a pulley 92, thence around a quartered pulley 93, and thence finally around another quartered pulley 94, from which pulley it is extended to the drum 57, to which it is secured.

The rope or cable for opening and closing the jaws of the bucket is indicated by the numeral 95. This rope is connected to the grooved roller or pulley 81 of the clam-shell bucket. It is then extended upwardly in engagement with a guide-pulley 96, thence around the pulley 49 of the carriage, thence forwardly and around a pulley 97 at the forward end of the boom, thence upwardly and rearwardly over a pulley 98 and under a pulley 99, thence to pulley 100, from the latter pulley to pulley 101, thence around pulley 102, and thence downwardly to drum 56. The rope or cable is wound a plurality of times around this drum and preferably secured thereto, and is then extended upwardly to a pulley 103, and is then extended downwardly to another pulley 104, which is carried by a counterweight 105. The rope or cable is extended back and forth from these two pulleys 103 and 104 for the purpose of multiplying the motion, and is finally connected to an arm 106, extending upwardly from the counterweight. A short cable 107 is connected to the shaft 80 of the bucket and is then extended upwardly for connection at the point 83.

The boom is raised or lowered on its pivot by means of a rope or cable 108, which may be operated in any desirable manner, or said boom may be raised by cable 95. It will be understood that the line 108 is extended and connected to a winch. (Not shown.) When, therefore, the winch is turned in one direction, the rope or cable 108 is wound thereon, whereby the boom is necessarily raised, and when the winch is turned in the opposite direction the rope or cable 108 is unwound and of course the boom is lowered. Cable 95 will of course raise or lower the boom when the drum 56, to which said cable is connected, is rotated in the proper direction for effecting the raising or lowering, as the case may be, and the other drum 57 held fast. Cable 95 can also be operated so as to swing the whole boom-frame horizontally in one direction in order to determine the position of the bucket with relation to the hatchway of the vessel. The boom-frame may be swung in an opposite direction by any desirable means—such, for instance, as a pendent rope. Attention is further directed to the fact that the boom-frame may be raised or lowered by the cable 86 when the drum 56 is held fast and the drum 57 rotated in a proper direction, in accordance with whether it is desired to raise or lower the boom.

The operation of my invention is as follows: In the position of the bucket shown in Fig. 1 it will be supposed that said bucket is descending into the hold of the vessel. When it is thus descending, neither the friction 58 nor the friction 59 is in direct engagement with the small friction 53. As the bucket thus descends, the cable 86 unwinds from the drum 57, the speed of rotation of said drum being regulated by the engagement of the friction 59 with the brake 76, and that portion of cable 95 leading to the bucket is unwound from drum 56 by the descent of the bucket, while that portion of cable 95 leading to the counterweight is wound up on drum 56, and consequently said counterweight is raised. When the bucket is lowered sufficiently, the next operation is to cause the pivoted bottom jaws of the bucket to be opened. This is accomplished by thrusting the friction 59 in firm engagement with the brake 76 by a proper manipulation of the lever 69, so that said friction cannot rotate. This will hold the drum 57. The reversing-friction 72 is now adjusted so as to also throw it into engagement with the friction 58 in order to rotate drum 56, so that that portion of the cable 95 leading to the counterweight is wound up on the drum 56, as before, so as to pull on said portion of the cable, and thereby still further elevate the counterweight, while the portion of the cable 95 leading to the bucket is slackened. This slackening permits the pivoted bottom-sections of the bucket to be swung on their pivots and opened, the slack of the cable being taken up by the winding of said cable on the grooved roller 81 and the short cable 107 unwound from the shaft of said roller 81. It is of course obvious that the pivoted bottom-sections may be slowly opened during the descent of the bucket and before said bucket has reached the limit of its down movement, and this is accomplished merely by braking friction 59 to such an extent as to cause the cable 86 to unwind from drum 57 slower than cable 95 unwinds from drum 56. After the pivoted bottom-sections are opened in the manner described the next step is to close the pivoted bottom-sections of the bucket, and thereby fill said bucket. This is accomplished by manipulating the lever 75 so as to allow the springs 73 to return reversing-friction 72 back to its former position out of engagement with friction 58, if by the previous operation it had been put in engagement with friction 58. The lever 65 is now manipulated so as to cause the eccentric 60 to thrust the friction 58 into engagement with friction 53. Drum 56 will now be rotated in a reverse direction to that first explained—that is to say, it will rotate in a direction to cause a slackening of that portion of cable 95 which leads to the counterweight 105, so as to permit said portion of cable 95 to unwind from the drum, and thereby allow the descent of the counterweight, while that portion of cable 95 which leads to the bucket will be wound up on the drum 56, and consequently a tightening of that portion of the cable will result, thereby unwinding said portion of the cable from the grooved roller 81 and winding up the short cable 107 on the shaft of the grooved roller 81, thereby causing a closing of the pivoted bottom-sections of the bucket. After the closing is thus effected the next step is to hoist the bucket to the carriage and then cause the travel of the carriage along the track. To accomplish this, lever 65 is manipulated so as to throw friction 58 out of engagement with friction 53, and manipulate lever 69 so as to operate on eccentric 61 and cause the friction 59 to be thrust into engagement with friction 53. This will cause a rotation of drum 57 in a direction to wind up on cable 86, and consequently elevate the bucket. Of course with this up movement of the bucket a slack would ordinarily be produced in the cable 95; but this slack, during the entire up movement of the bucket, is taken up by reason of the descent of the counterweight 105. After the bucket has been elevated a certain distance the trunnions 109 109 of the pulley 85 will pass into the slots 31 and will act against the lower hooked ends of the levers 32 and turn said levers so as to permit the trunnions to pass above the hooks, and the moment said trunnions leave the hooks the levers 32 will be returned to their normal position by the springs 33, and the hooks thereby engaging under the trunnions, as shown in Fig. 6, whereby the locking of the bucket to the carriage is effected. The continued rotation of the drum 57 in the direction described will now cause the carriage, with the attached bucket, to travel along the track, and when the point is reached where it is desired to discharge the material the carriage is stopped by stopping the rotation of the drum 57, and the pivoted bottom-sections of the bucket opened in the manner already fully described and the material thereby discharged. In Fig. 1 of the drawings I have shown a hopper 110, in which the discharged material is adapted to pass, and beneath this hopper is a car 111, adapted to receive the material from the hopper. It is obvious, however, that the carriage may be stopped and the material discharged at any point along the track. It will be understood that the hook of the locking-arm 34 is released from engagement with the locking-rod 48, so as to permit of the travel of the carriage up the inclined track by reason of the contact of the trunnions 109 with the side members of the arm 34 on the up movement of said trunnions in the slots 31 in the act of locking the bucket to the carriage. The moment the hook of arm 34 is raised out of engagement with this rod 48 the carriage is then free to travel, and when the hook entirely clears the rod 48 the arm 34 drops to its normal position. After the material is discharged and it is desired to return the carriage and bucket to the end of the boom, or to the position shown in Fig. 1, the lever 69 is again manipulated so as to throw friction 59 out of engagement with friction 53. This will cause the counterweight 105 to descend by the unwinding of that portion of the cable 95 leading from the counterweight to the drum 56 and the winding up on the drum 56 of that portion of cable 95 leading to the bucket. The carriage, therefore, is free to travel down the inclined track by gravity and by the pull of weight 105, the cable 86 at the same time unwinding from the drum 57, the speed of rotation of said drum being regulated by the engagement of the friction 59 with brake 76. When the carriage reaches the end of its travel down the inclined track, the hook 35 of the locking-arm 34 will engage over the rod 48, and will also contact with the bumper 44, said bumper preventing jar and concussion. This engagement of the hook of the locking-arm 34 will occur, however, before the carriage has quite completed its full movement. At this time it is impossible for the levers 32 to turn on their pivots, as said levers are bearing against the abrupt shoulders 39 of the recesses 38. (See Fig. 7.) The forward movement of the carriage, however, to the extent permitted by the slots 36 will cause a pull on the upper arms of the levers 32 and a consequent turning of said levers on their pivots, so as to release the hooks of the levers from engagement with the trunnions 109 of pulley 85, whereby the bucket is unlocked and is permitted to descend, the levers 32 returning to their normal positions the moment the carriage has fully completed its movement by the action of the coiled springs 33. When the carriage completes its full movement, the pulley 49 contacts with the curved edges of the side pieces 47, which side pieces, therefore, act as stops for the carriage.

From the description of the operation of my invention it will be seen that the counterweight is adapted on the raising or lowering of the bucket to the carriage or on the travel of the carriage along the track to hold the pivoted jaws of the bucket locked, irrespective as to whether or not the drums are operatively connected to the motive power. It will also be observed that the counterweight is adapted, on the raising thereof, to slacken that part of its cable which leads to the bucket in order to permit the pivoted bottom sections of the bucket to open.

It will be understood that the position of the boom-frame and boom with respect to the material to be raised is regulated by swinging said boom-frame and boom on the rail 19. The distance of the boom from the material to be raised is regulated by the cable 108 or by the cable 95 or 86, as hereinbefore fully described.

It is obvious that the particular arrangement of pulleys herein shown and described is not absolutely essential, as any other desirable arrangement whereby the cables may be extended to and from the drums to the carriage and to the bucket and from one of the drums to the counterweight may be adopted without departing from the spirit and scope of my invention. It is also obvious that it is not absolutely essential that the cable 95 should pass over a pulley, such as 97, at the extreme end of the boom, as said cable may be carried down to the bucket from the pulley 98 or from any other desirable point.

It will be further understood that it is contemplated that the stopping and locking mechanism for the carriage may be arranged not only at the place shown in the drawings, but at one or more points along the track.

Figures 12, 13:
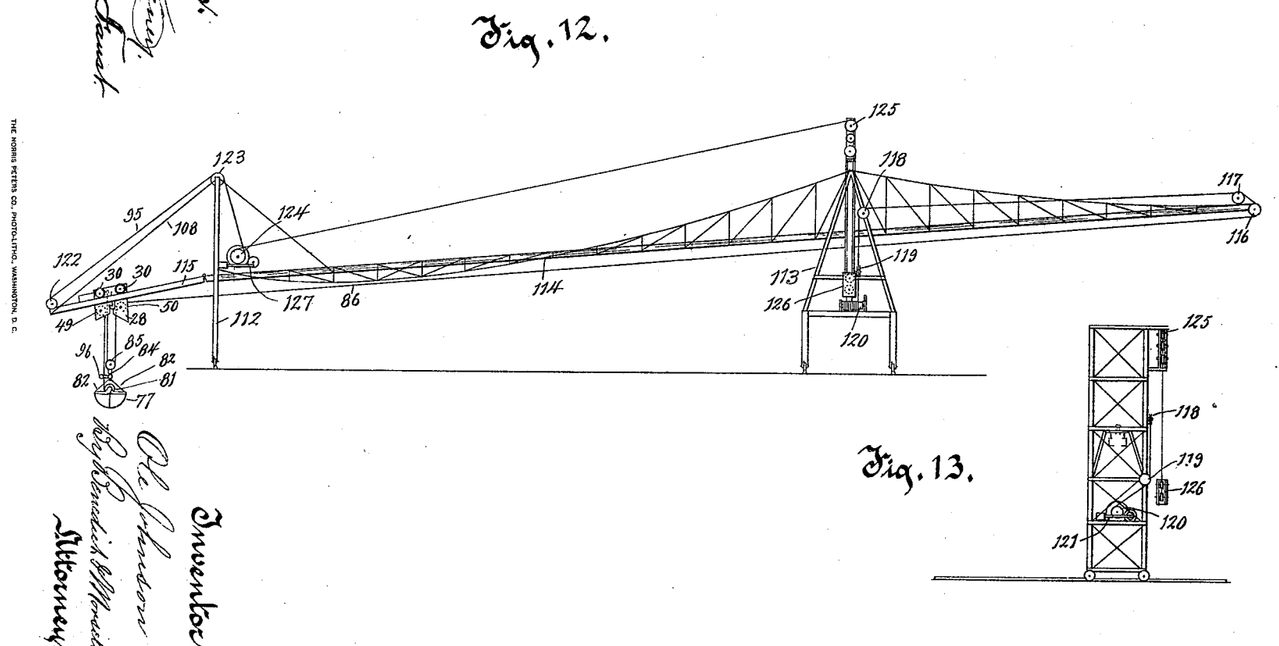
Fig. 13 is an end view of the tower at the right-hand end of Fig. 12.

Figs. 12 and 13 of the drawings show the application of my invention to a so-called "cantaliver-bridge derrick." In these figures the numeral 112 indicates a forward tower, and 113 a rear tower, said towers adapted to travel on suitable rails. Between these towers is suspended a cantaliver-bridge 114, and to the forward end of this bridge is pivoted a boom 115. The same form of carriage is employed and also the same cables as in the preceding form of my invention. These cables, however, are operated in a different manner than in the preceding form, as will now be explained. The hoisting and pulling cable extends downwardly from a fixed point of the carriage to and around pulley 85, as before. It is then extended rearwardly to the end of the cantaliver-bridge and around two pulleys 116 and 117, thence forwardly and over a pulley 118, thence downwardly and beneath another pulley 119, and finally to the drum 120, said drum being adapted to be operated by any suitable engine mechanism 121. The cable 95 starts from the grooved roller 81, is then extended upwardly over pulley 49, thence forwardly over a pulley 122, thence upwardly and rearwardly over a pulley 123, thence downwardly and wound a plurality of times around a drum 124, and fastened thereto, thence from said drum to a pulley 125, and from said pulley downwardly to a counterweight 126. It is extended back and forth from pulleys carried by the counterweight to pulleys located below pulley 125. The drum 124 is also operated by separate engine mechanism 127. The operation of this form of my invention is similar to the first-described form, excepting that the two drums for the two cables are operated by separate engine mechanisms.

Figure 14:
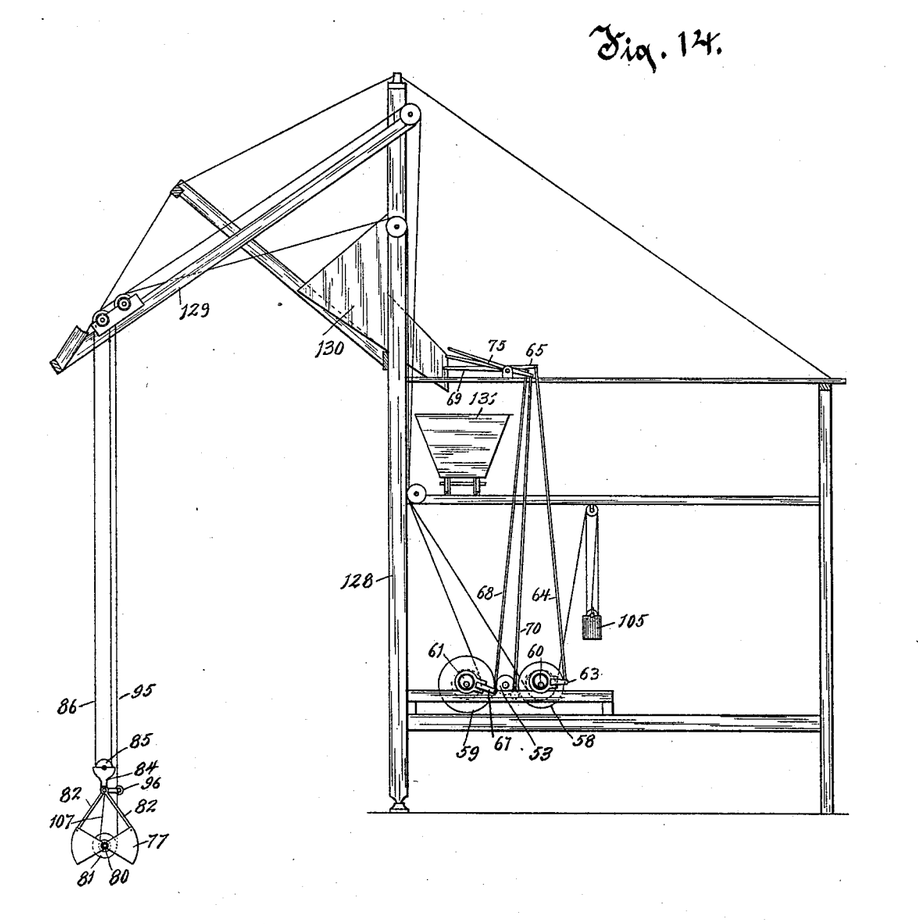
Fig. 14 is a side elevation showing my invention applied to a different form of boom-frame and boom.

In Fig. 14 is shown an application of my invention to still another form of boom-frame. The frame in this figure of the drawings is indicated by the numeral 128 and the boom by the numeral 129. The carriage, buckets, drums, cables, and operating means for the drums and cables are the same as in the Fig. 1 form of construction. A different arrangement of pulleys over which the cables pass, however, is necessarily required in order to suit the changed form of frame, and the position of the cables themselves are also somewhat changed. In other words, the cable 95 occupies the right-hand position with respect to the bucket instead of the left-hand position, as shown in Fig. 1, and the cable 86 is on the left of the bucket instead of on the right, as in Fig. 1. In this form of boom-frame a hopper 130 is provided, into which the bucket is adapted to discharge, said hopper in turn adapted to discharge into a car 131, located beneath the same. In this form of the invention the incline of the boom is so great that no locking mechanism for the carriage is requird, the stopping being accomplished merely by stopping the engine mechanism or shifting the stopping-block.

What I claim as my invention is—

1. In an apparatus for elevating, transporting and delivering material, the combination, of a track, a carriage adapted to travel on said track, a bucket having opening and closing means, drums, mechanism for rotating the drums in the same direction, or in opposite directions, and at the same speed, or at variable speeds, a counterweight, a hoisting-cable connected to the carriage, and extending downwardly to and around a pulley, or equivalent, connected to the bucket, thence extended upwardly over a pulley carried by the carriage, and thence extended to and connected with one of the drums, another cable connected to the opening and closing mechanism of the bucket, thence extended upwardly over a pulley carried by the carriage, thence extended to the other drum and around said drum, and finally extended to and connected with the counterweight, and adapted for raising and lowering said counterweight in accordance with the direction of rotation of said drum, said counterweight thereby controlling said cable and causing said cable to hold the bucket closed when the speeds of rotation of the drums are the same, and when the counterweight-drum is rotated in a direction to raise the counterweight, and when the speed of rotation of the counterweight-drum exceeds the speed of the hoisting-cable drum causing said cable to act on the opening and closing mechanism of the bucket in order to open the bucket, and when the counterweight-drum is rotating in an opposite direction, said counterweight adapted to descend and unwind the portion of its cable leading therefrom to the drum, and wind up on the drum the portion of the cable leading to the opening and closing mechanism of the bucket, whereby said bucket is closed.

2. In an apparatus for elevating, transporting and delivering material, the combination, of a track, a carriage adapted to travel on said track, a bucket having pivoted bottom sections, a grooved roller mounted on a shaft journaled in the bucket, a short cable connected to said shaft and to a fixed point of the bucket, drums, mechanism for rotating the drums in the same direction, or in opposite directions, and at the same speed, or at variable speeds, a counterweight, a hoisting-cable connected to the carriage and extending downwardly to and around a pulley, or equivalent, connected to the bucket, thence extended upwardly over a pulley carried by the carriage, and thence extended to and connected with one of the drums, another cable connected to the grooved roller mounted on the shaft of the bucket, thence extended upwardly over a pulley carried by the carriage, thence extended to the other drum and around said drum, and finally extended to and connected with the counterweight and adapted for raising and lowering said counterweight in accordance with the direction of rotation of said drum, said counterweight thereby controlling the said cable and causing said cable to hold the pivoted bottom sections of the bucket closed when the speeds of rotation of the drums are the same, and when the counterweight-drum is rotated in a direction to raise the counterweight, and to cause said cable to open the pivoted bottom sections of the bucket, when the counterweight is ascending, and when the speed of rotation of the counterweight-drum exceeds the speed of rotation of the hoisting-cable drum, and said counterweight when its drum is rotating in an opposite direction adapted to descend and unwind the portion of its cable leading therefrom to the drum, and wind up on the drum, the portion of its cable leading to the grooved roller of the bucket, whereby the pivoted bottom sections of the bucket are closed.

3. In an apparatus for elevating, transporting, and delivering material, the combination, of a track, a carriage adapted to travel on said track, a bucket having opening and closing means, a driving-shaft having a driving-gear mounted thereon, driven shafts, each having a drum mounted thereon and a gear mounted thereon, means for throwing either of said gears into engagement with the driving-gear, a reversing-gear adapted to be in engagement with the driving-gear, means for throwing said reversing-gear also into engagement with one of the other gears, a counterweight, a hoisting-cable connected to the carriage and extended downwardly to and around a pulley, or equivalent, connected to the bucket, thence extended upwardly over a pulley carried by the carriage, and thence extended for connection to one of the drums, another cable connected to the opening and closing mechanism of the bucket, thence extended upwardly over a pulley carried by the carriage, thence extended to the other drum and around said drum, and finally extended to and connected with the counterweight, and adapted for raising and lowering said counterweight in accordance with the direction of rotation of said drum, said counterweight thereby controlling said cable and causing said cable to hold the bucket closed when the speeds of rotation of the drums are the same, and when the counterweight-drum is rotated in a direction to raise the counterweight, and to cause said cable to act on the opening and closing mechanism of the bucket in order to open the bucket when the counterweight is ascending, and when the speed of rotation of the counterweight-drum exceeds the speed of rotation of the hoisting-cable drum, said counterweight when its drum is rotated in an opposite direction adapted to descend and unwind the portion of the cable leading therefrom to the drum, and wind up the portion of the cable leading to the opening and closing mechanism of the bucket, whereby said bucket is closed.

4. The combination, of a track, a stop arranged in the line of the track, said stop having a curved edge, a spring-actuated bumper also arranged in the line of said track, and a carriage adapted to travel on the track, said carriage carrying a pulley, the carriage adapted to contact with the bumper, and the pulley carried by the carriage to contact with the curved stop, after the carriage has traveled a certain distance.

5. In an apparatus for elevating, transporting, and delivering material, the combination, of a track, a carriage adapted to travel thereon, an arm having two side members, said side members provided medially, upon their inner sides, with recesses terminating in abrupt shoulders, and said side members, at one end, provided with elongated slots, a pin extending through said slots and through the carriage, spring-actuated levers pivoted to the carriage, said levers fitting the recesses in the side members of the arm, a contact which the arm is adapted to strike, after the carriage has traveled a certain distance, a bucket having trunnions projecting therefrom, and means for raising and lowering the bucket, the raising of said bucket causing the trunnions to act against the hooked ends of the levers and to ride clear of the same, and to be engaged by said hooked ends of the levers, after having thus cleared the same.

6. In an apparatus for elevating, transporting, and delivering material, the combination of a track, a catch arranged in the line of said track, a carriage adapted to travel on the track, an arm provided at one end with a projecting hook or latch, said arm having two side members provided medially upon their inner sides with recesses terminating in abrupt shoulders, said side members at one end provided with elongated slots, a pin extending through said slots and through the carriage, spring-actuated levers pivoted to the carriage, said levers fitting the recesses in the side members of the arm, a contact with which the arm is adapted to strike, after the carriage has traveled a certain distance, a bucket having trunnions projecting therefrom, and means for raising and lowering the bucket, the raising of said bucket causing the trunnions to act against the hooked ends of the levers and to ride clear of the same, and to be engaged by said hooked ends of the levers, after having thus cleared the same.

In testimony whereof I affix my signature in presence of two witnesses.

OLE JOHNSON.

Witnesses:
A. L. MORSELL,
C. H. KEENEY.